(12) United States Patent
Brunswick et al.

(10) Patent No.: US 6,908,222 B2
(45) Date of Patent: Jun. 21, 2005

(54) ATTACHMENT MECHANISM

(75) Inventors: Brian A. Brunswick, Troy, OH (US); Janice J. Schnipke, Springfield, OH (US); Thomas S. Donthnier, Vandalia, OH (US); Gongpu Yan, deceased, late of Troy, OH (US); by Lilian Chen, legal representative, Milpitas, CA (US)

(73) Assignee: Premark FEG L.L.C., Wilmington, DE (US)

( * ) Notice: Subject to any disclaimer, the term of this patent is extended or adjusted under 35 U.S.C. 154(b) by 195 days.

(21) Appl. No.: 10/155,447

(22) Filed: May 24, 2002

(65) Prior Publication Data
US 2002/0181322 A1 Dec. 5, 2002

Related U.S. Application Data

(60) Provisional application No. 60/294,446, filed on May 30, 2001.

(51) Int. Cl.[7] .................................................. A47J 43/07
(52) U.S. Cl. ........................ 366/331; 403/328; 403/330; 403/375
(58) Field of Search ................................. 366/203, 207, 366/197, 288, 331; 403/326–330, 315–316, 319, 361, 375, 355; 99/348

(56) References Cited

U.S. PATENT DOCUMENTS

| 535,880 A | | 3/1895 | Anderson | |
|---|---|---|---|---|
| 1,167,336 A | * | 1/1916 | Clark | 366/288 |
| 1,175,530 A | * | 3/1916 | Kirchhoff | 366/197 |
| 1,264,128 A | * | 4/1918 | Rataiczak et al. | 366/331 |
| 1,467,820 A | * | 9/1923 | Trust et al. | 366/331 |
| 1,783,437 A | * | 12/1930 | Laib | 366/288 |
| 2,169,014 A | | 8/1939 | Aalborg | |
| 2,329,640 A | * | 9/1943 | Moeller | 366/331 |
| 2,621,906 A | * | 12/1952 | Van Guilder | 403/326 |

(Continued)

FOREIGN PATENT DOCUMENTS

| DE | 1174954 | 7/1964 |
|---|---|---|
| DE | 2802155 | 7/1979 |
| GB | 889462 | 2/1962 |

OTHER PUBLICATIONS

"General Purpose Couplings, Chrome–Plated Brass, 4" Flow, LC Series," catalog of CPC, pp. 22–23.
Instructions manual entitled "H600 & L800 Mixers," Hobart Corporation (Dec. 1999).
Service manual entitled "Models H–600 and H–600–T and L–800 Mixers," Hobart Corporation (Aug. 1977).

Primary Examiner—Charles E. Cooley
(74) Attorney, Agent, or Firm—Thompson Hine LLP

(57) ABSTRACT

A mixing element for attachment to an output shaft of a mixer, the mixing element including a body having a mixing portion and a collar portion having an opening formed therein, the opening being shaped and located to receive the output shaft of a mixer therein. The mixing element further includes a retainer coupled to the body, the retainer being movable between an engaged position wherein at least part of the retainer protrudes into the opening and a disengaged position wherein the retainer does not protrude into the opening.

4 Claims, 15 Drawing Sheets

U.S. PATENT DOCUMENTS

| | | | | |
|---|---|---|---|---|
| 2,630,303 A | * | 3/1953 | Krucker | 403/331 |
| 2,639,904 A | | 5/1953 | McMaster et al. | |
| 2,832,575 A | * | 4/1958 | Cirone | 403/326 |
| 2,833,576 A | * | 5/1958 | Cirone | 403/360 |
| 4,079,917 A | * | 3/1978 | Popeil | 366/288 |
| 4,337,000 A | * | 6/1982 | Lehmann | 366/288 |
| 4,436,125 A | | 3/1984 | Blenkush | |
| 4,541,457 A | | 9/1985 | Blenkush | |
| 4,760,984 A | | 8/1988 | Hennessey | |
| 4,857,706 A | | 8/1989 | Diamond | |
| 4,946,285 A | | 8/1990 | Vennemeyer | |
| 5,052,725 A | | 10/1991 | Meyer et al. | |
| 5,104,158 A | | 4/1992 | Meyer et al. | |
| 5,316,041 A | | 5/1994 | Ramacier, Jr. et al. | |
| 5,464,300 A | | 11/1995 | Crainich | |
| 5,494,074 A | | 2/1996 | Ramacier, Jr. et al. | |
| 5,556,201 A | * | 9/1996 | Veltrop et al. | 366/288 |
| 5,567,047 A | * | 10/1996 | Fritsch | 366/129 |
| 5,758,963 A | * | 6/1998 | Xie et al. | 366/197 |
| 5,791,777 A | | 8/1998 | Mak | |
| 5,911,403 A | | 6/1999 | deCler et al. | |
| 5,934,802 A | * | 8/1999 | Xie | 366/100 |
| 5,938,244 A | | 8/1999 | Meyer | |
| 5,975,489 A | | 11/1999 | deCler et al. | |
| 6,024,124 A | | 2/2000 | Braun et al. | |
| 6,082,401 A | | 7/2000 | Braun et al. | |
| 6,439,760 B1 | * | 8/2002 | Langeloh et al. | 366/331 |
| 6,652,137 B1 | * | 11/2003 | Bosch et al. | 366/288 |
| 2004/0120218 A1 | * | 6/2004 | Donthnier et al. | 366/331 |
| 2004/0194636 A1 | * | 10/2004 | Huang et al. | 99/348 |

* cited by examiner

ATTACHMENT MECHANISM

This application claims priority to U.S. Provisional App. Ser. No. 60/294,446 filed May 30, 2001, the contents of which are hereby incorporated by reference.

The present invention is directed to an attachment mechanism, and more particularly, to an attachment mechanism for use with a mixer.

BACKGROUND

Mixers are used to mix and blend a variety of materials, such as food products and the like. The mixers typically include a removable mixing element that is attachable to a rotatable and/or orbitable output shaft of the mixer. Mixing elements may come in various sizes and shapes and include agitators such as whips, dough hooks, beaters, etc. The mixing elements are typically removably coupled to the output shaft to enable the mixing elements to be removed or replaced for cleaning, repair, use of a different type of mixing element, etc.

SUMMARY

In one embodiment, the present invention includes a mixing element that can be quickly and easily coupled to and uncoupled from an output shaft of a mixer. In one embodiment, the invention is a mixing element for attachment to an output shaft of a mixer, the mixing element including a body having a mixing portion and a collar portion having an opening formed therein, the opening being shaped and located to receive the output shaft of a mixer therein. The mixing element further includes a retainer coupled to the body, the retainer being movable between an engaged position wherein at least part of the retainer protrudes into the opening and a disengaged position wherein the retainer does not protrude into the opening.

Other objects and advantages of the present invention will be apparent from the following description and the accompanying drawings.

DETAILED DESCRIPTION

Figure 1:
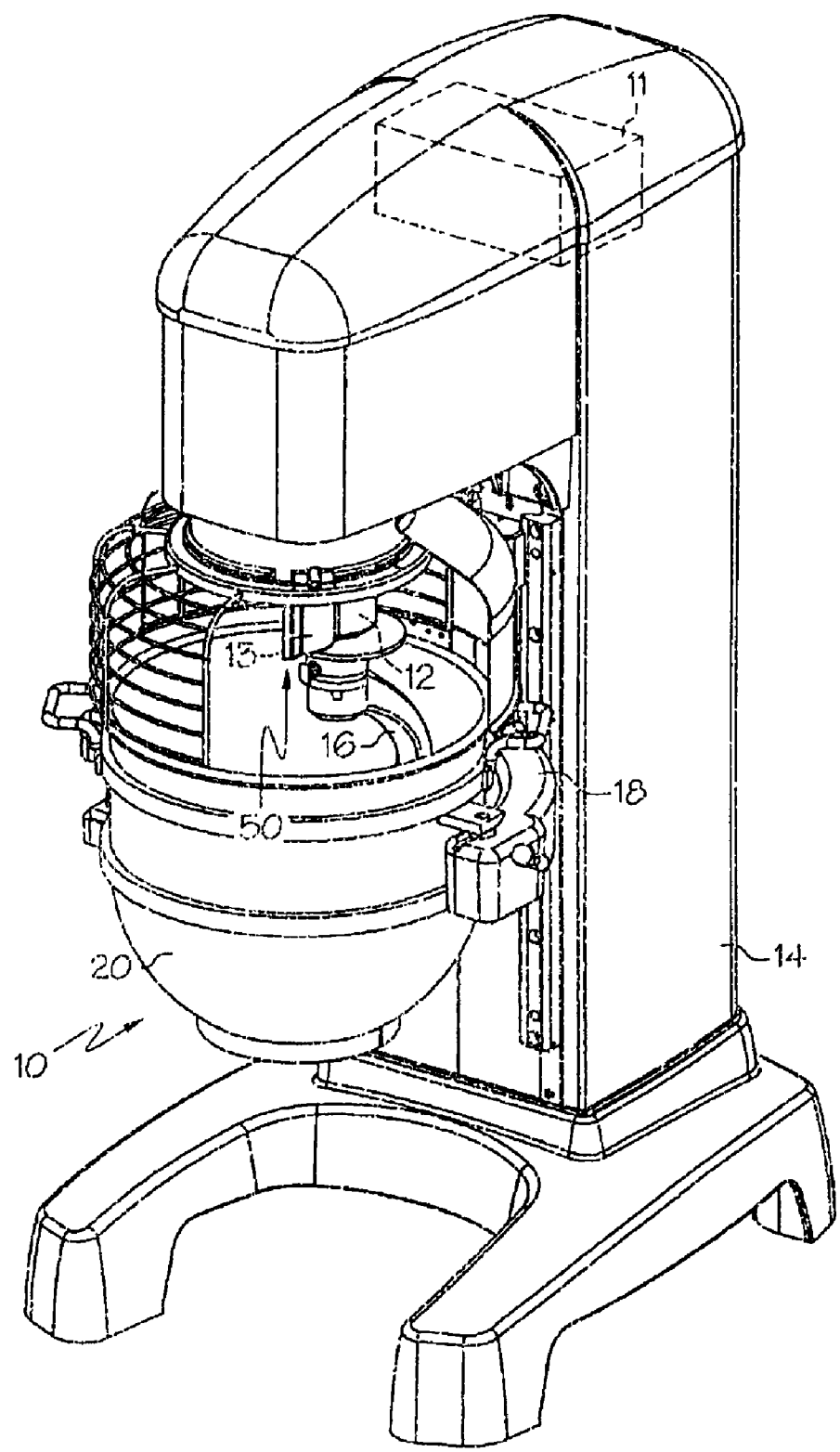
FIG. 1 is a front perspective view of a mixer including one embodiment of the attachment mechanism of the present invention.

As shown in FIG. 1, the present invention may include a mixer 10 having a mixer body 14 which houses a motor 11 therein. The motor 11 is operatively coupled to a rotatable main drive shaft 13, which is in turn operatively coupled to the rotatable and/or orbital output shaft or output component 12. The mixer 10 further includes a mixing element 16 that is attachable to the output shaft 12 such that rotation and/or orbital movement of the output shaft 12 can be transferred to the mixing element 16. During operation, the output shaft 12 and mixing element 16 may rotate about their own axes and/or orbit about the main drive shaft 13. The mixer body 14 may include a yoke 18 for receiving a bowl 20 thereon, such that when the bowl 20 is mounted on the yoke 18 and the mixing element 16 is received in the bowl 20, the contents of the bowl 20 can be mixed by the rotating and/or orbiting mixing element 16.

Figure 2:
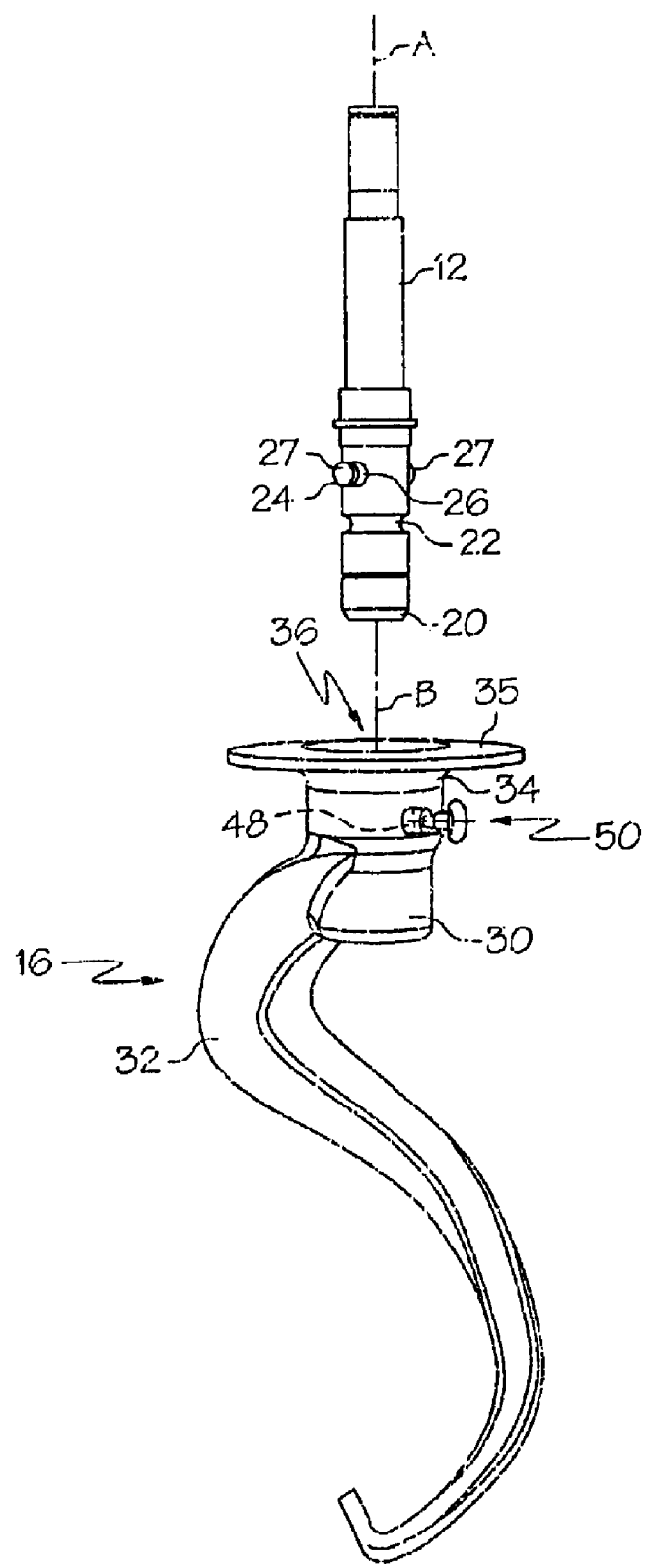
FIG. 2 is an exploded perspective view of an output shaft and mixing element of the mixer of FIG. 1.
Figure 5:
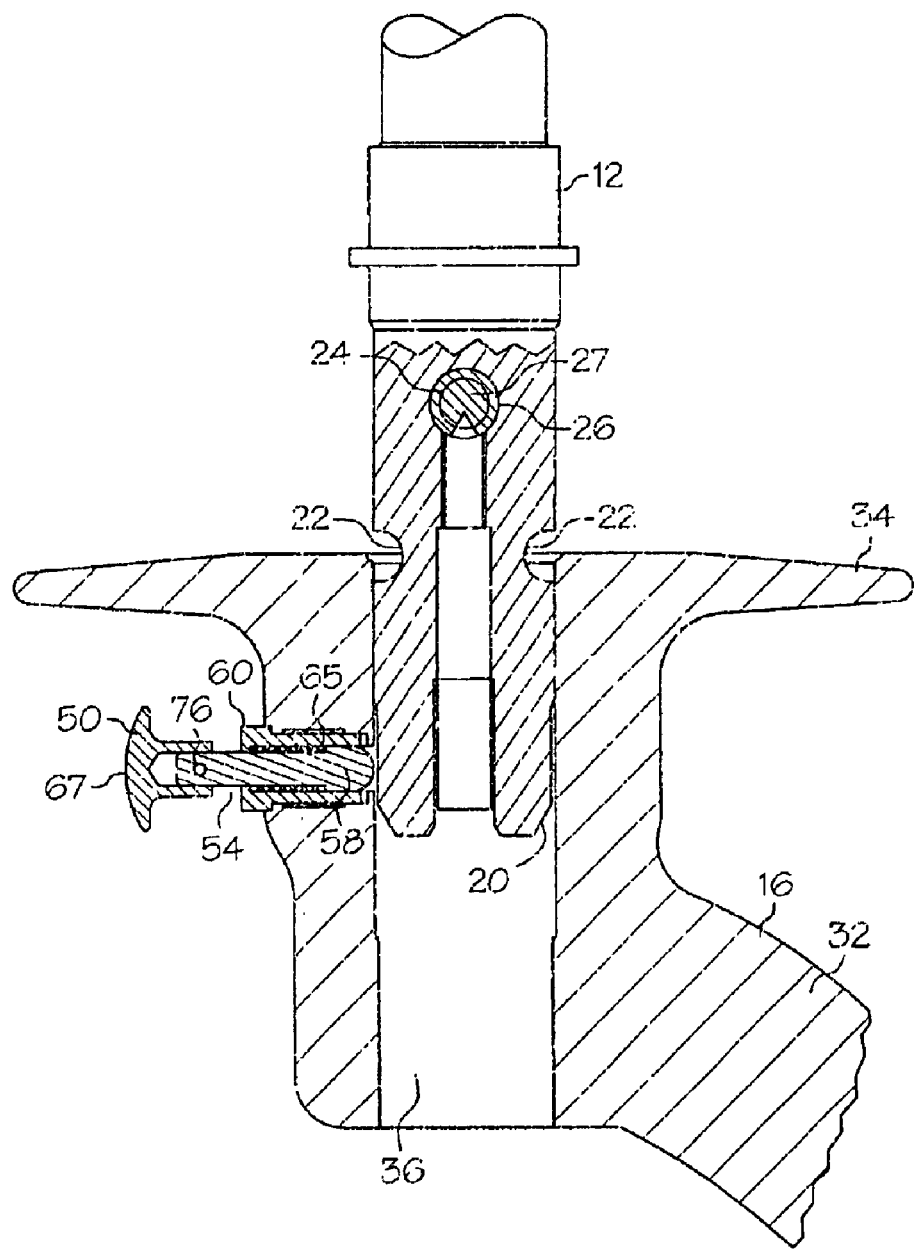
FIG. 5 is a side cross section of the output shaft and mixing element of FIG. 3.
Figure 6:
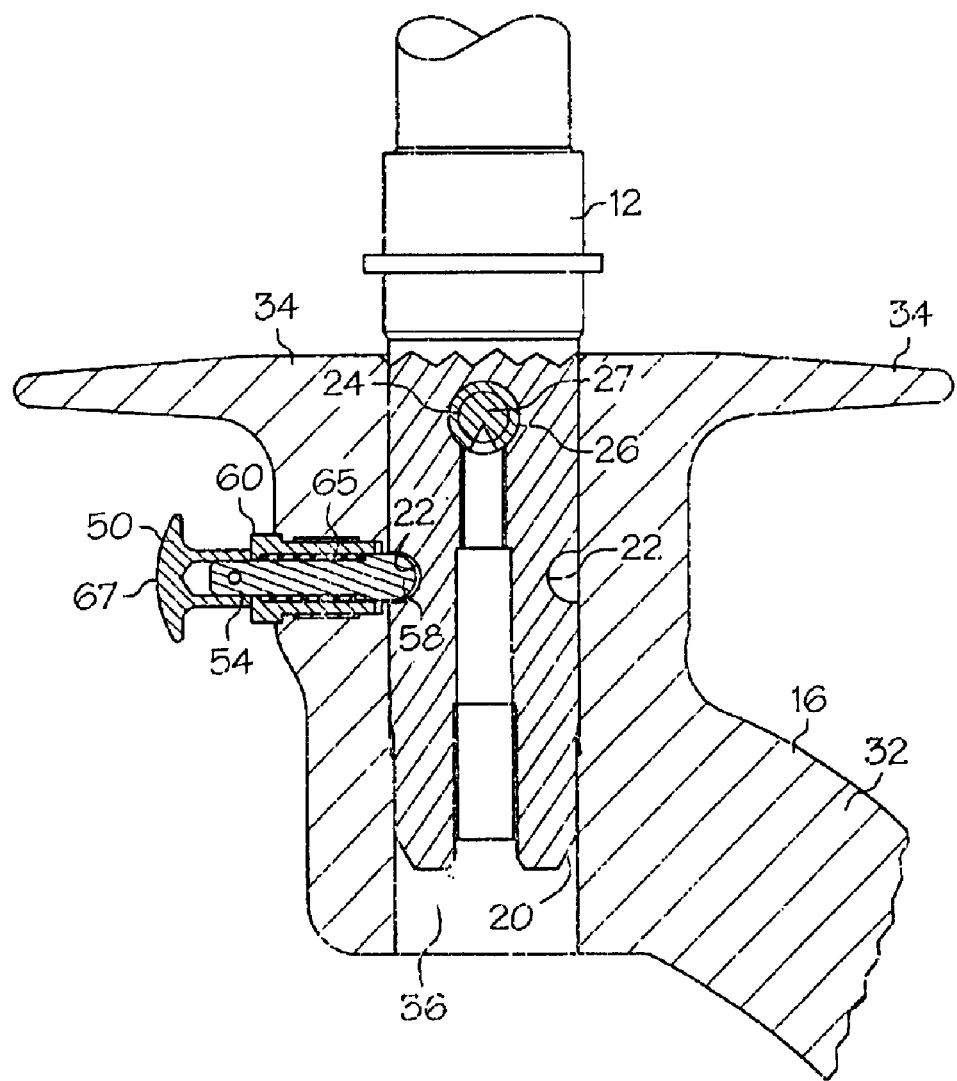
FIG. 6 is a side cross section of the output shaft and mixing element of FIG. 5, with the output shaft fully received in the mixing element and the actuator assembly in its extended position.
Figure 7:
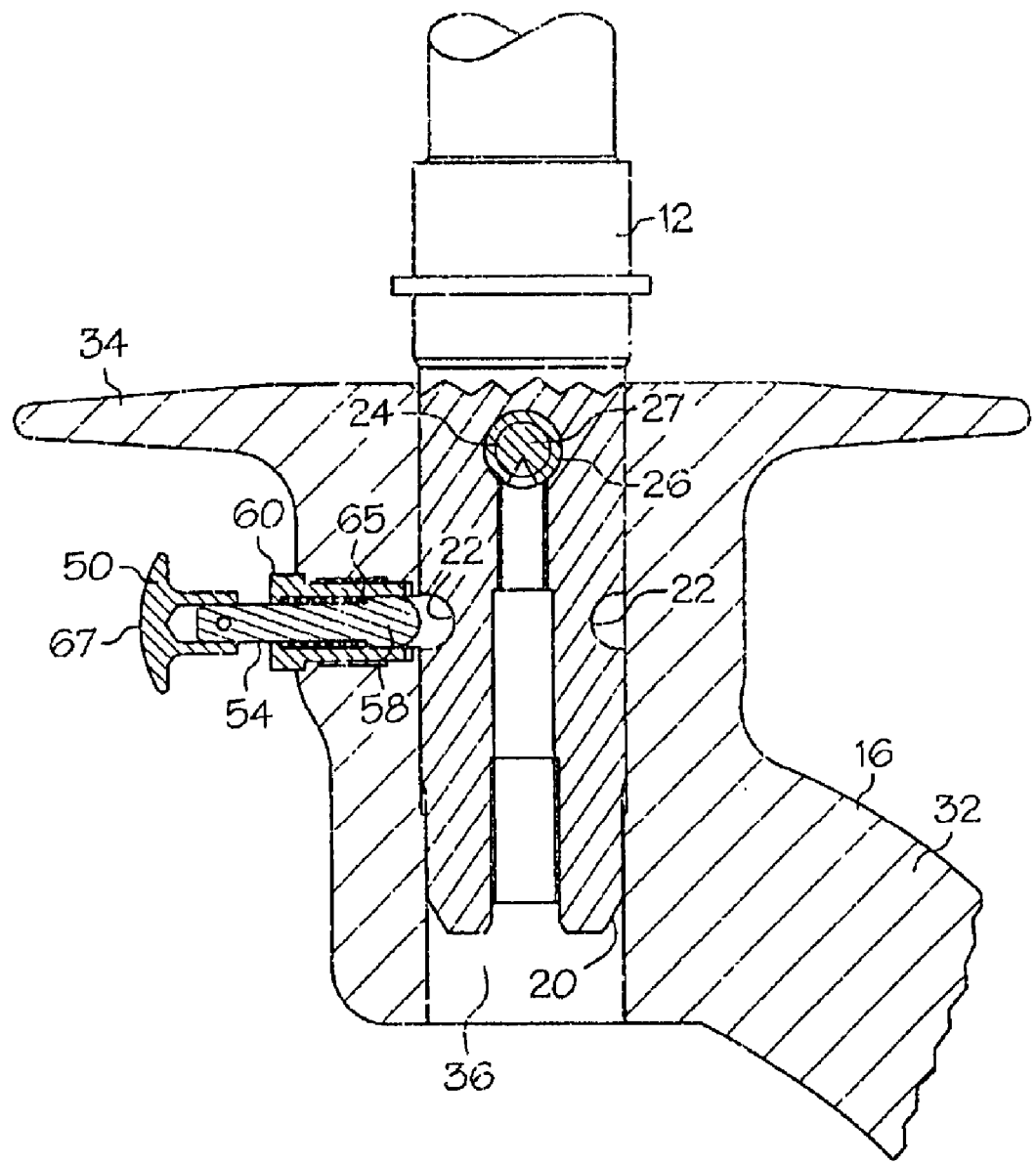
FIG. 7 is a side cross section of the output shaft and mixing element of FIG. 6, with the actuator assembly in its retracted position.
Figure 8:
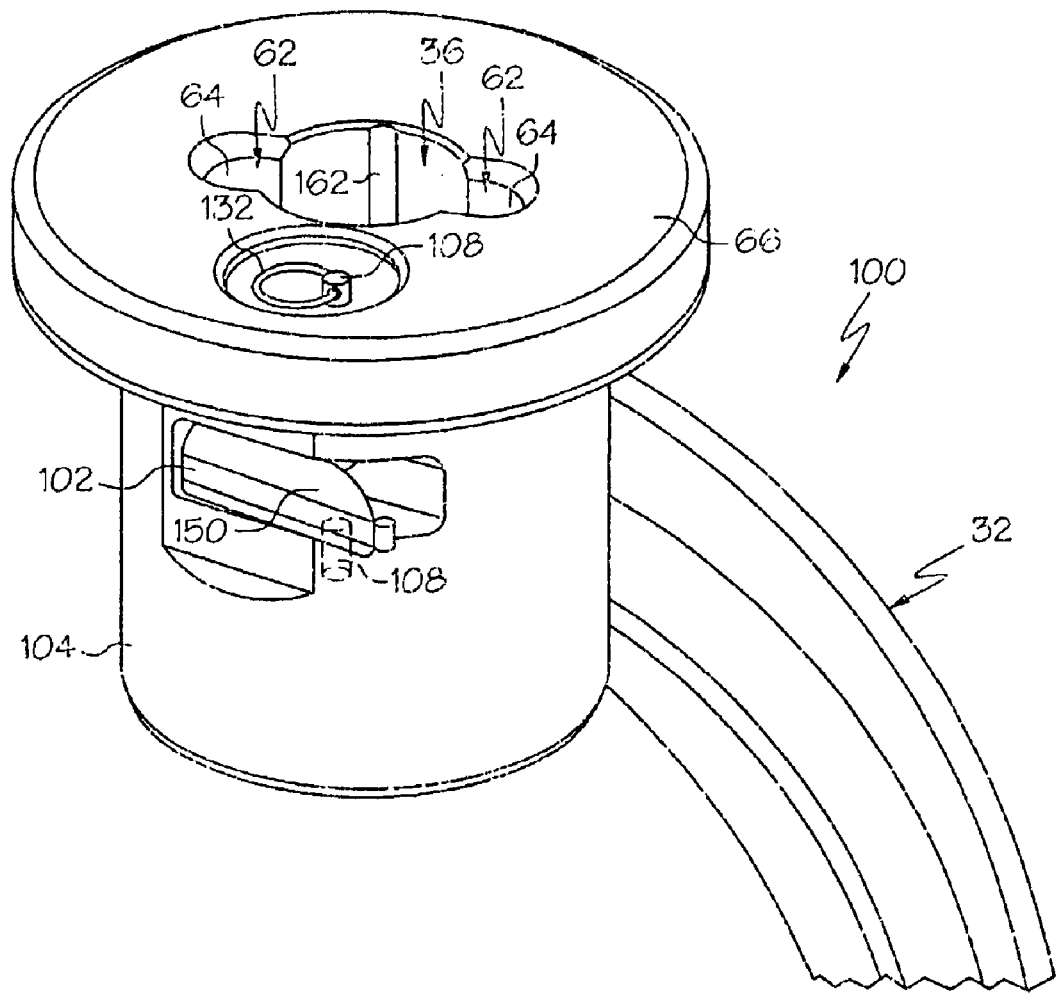
FIG. 8 is a detail upper perspective view of the another embodiment of a mixing element.

As shown in FIG. 2, the output shaft 12 may extend generally vertically and be rotatable about its central axis A. The output shaft 12 may include a tapered or angled tip 20 and a recess or groove 22. The output shaft 12 is preferably cylindrical or circular in cross section, and the recess 22 preferably extends around the perimeter of the output shaft 12. As shown in FIGS. 5–7, the recess 22 is preferably generally semi-circular in cross section. The output shaft 12 may includes a driving pin 24 that extends generally transversely to the central axis A of the output shaft 12, and includes a pair of protruding portions 27 which define a driving surface or torque transmitting surface 26.

The mixing element 16 may be made of stainless steel, and may include a body 30 having a mixing portion, generally designated 32, and a collar portion, generally designated 34. In the illustrated embodiment, the collar portion 34 may include an outwardly extending flange 35; however, the collar portion 34 need not necessarily include the flange 35, and may simply include an upper portion of the mixing element 16. The illustrated flange 35 may also be moved to various other positions on the mixing element 16. However, even when the flange 35 is moved to other locations, the collar portion 34 can still be considered to be located at the upper end of the mixing element 16, regardless of the position of the flange 35.

The collar portion 34 may have a central opening 36 having a central axis B formed therein. The central opening 36 is shaped to closely receive the lower end of the output shaft 12 therein, and is preferably generally cylindrically-shaped. The mixing portion 32 of the mixing element 16 can be any of a variety of shapes for mixing or processing materials, including agitators such as whips, dough hooks, dough arms, beaters, pastry knives, scrapers, etc.

Figure 2A:
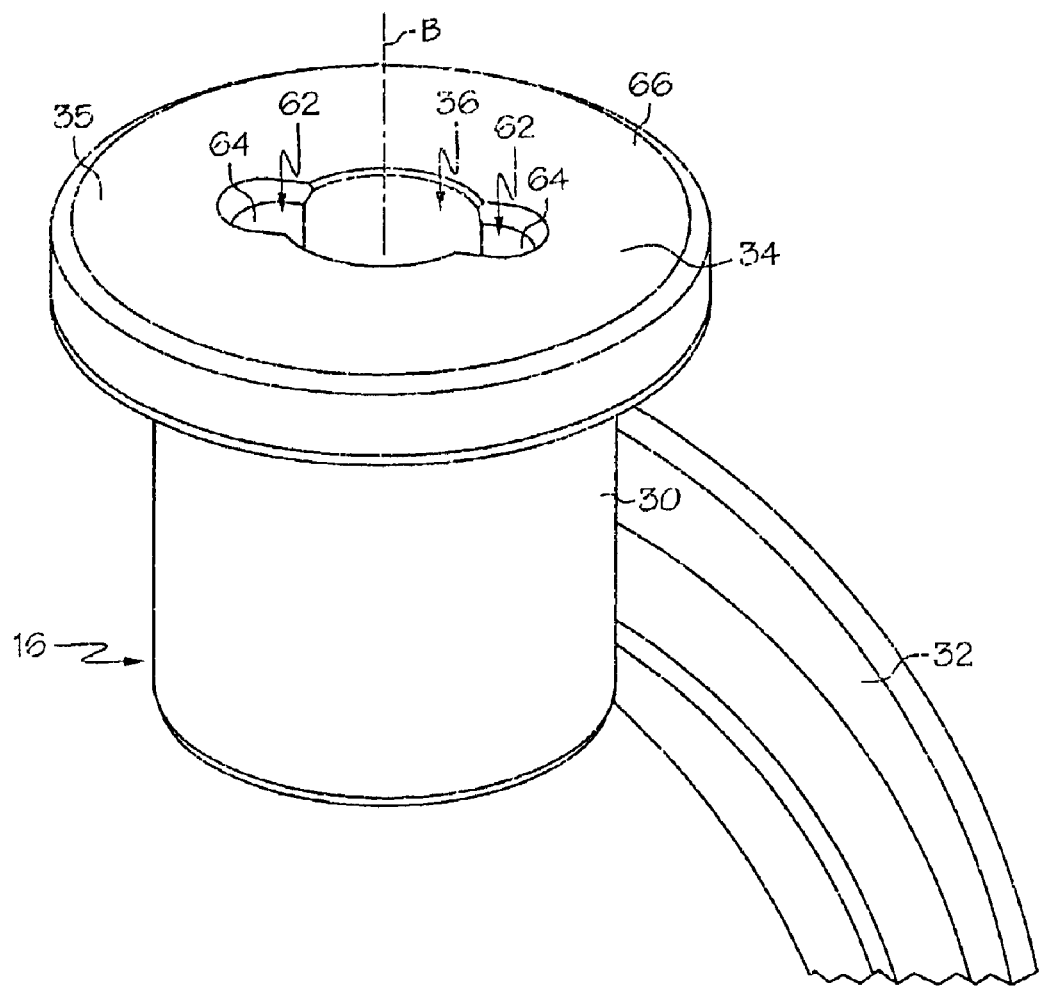
FIG. 2A is a detail upper perspective view of the mixing element of FIG. 2.

As best shown in FIG. 2A, the upper end of the mixing element 16 may include a pair of opposed pin recesses 62, each of which defines a surface 64. Each pin recess 62 is shaped to receive a protruding portion 27 and driving surface 26 of the driving pin 24 of the output shaft 12 therein such that rotation of the output shaft 12 can be transmitted to the mixing element 16. The pin recesses 62 preferably extend generally perpendicular to the central axis B of the opening 36, and transversely across a top face 66 of the collar portion 34. Each of the protruding portions 27 and each of the pin recesses 62 are preferably located about 180° apart from the other protruding pin 27 and pin recess 62, respectively, such that the protruding portions 27 provide an even driving force to the mixing element 16 when the output shaft 12 drives the mixing element 16.

Figure 4:
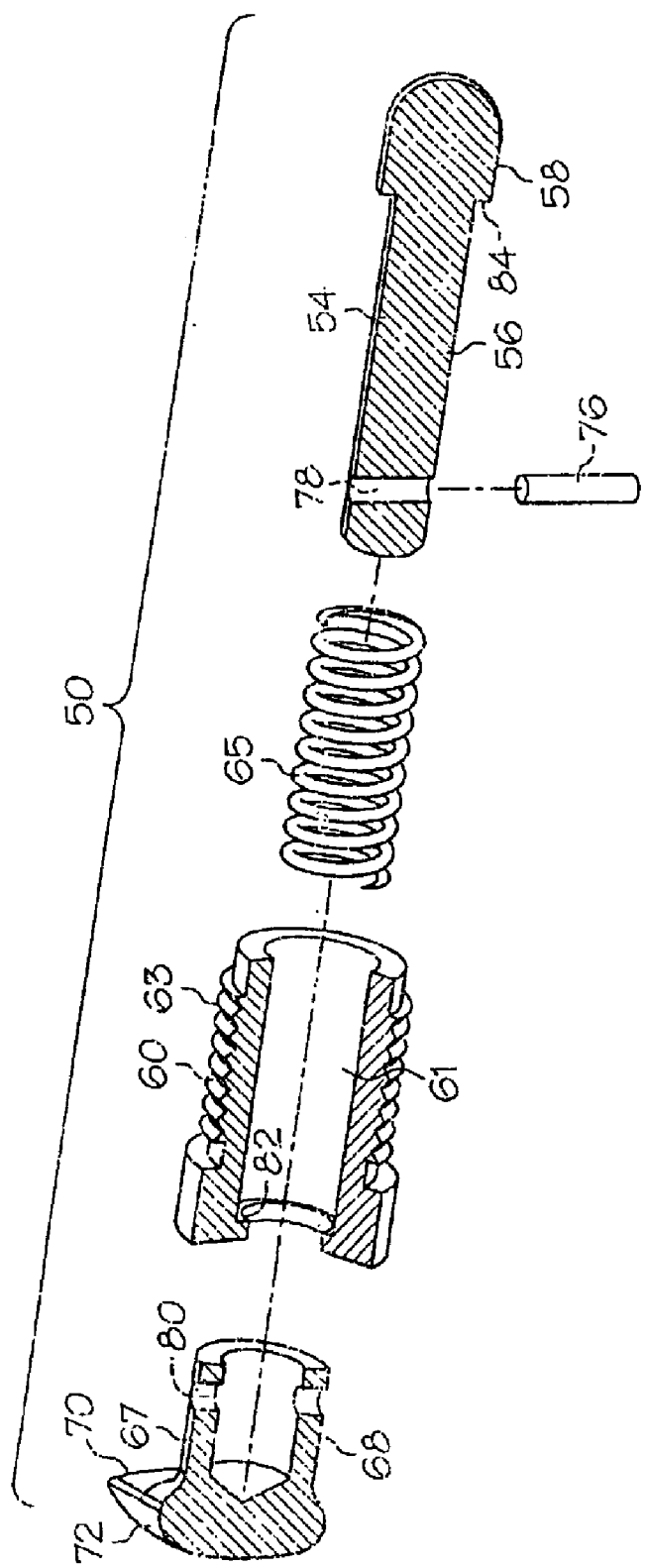
FIG. 4 is an exploded, perspective view of the actuator assembly of the mixer of FIG. 1, with the cross sections of the various components being shown as shaded portions.

As shown in FIG. 2, the collar portion 34 may have an actuator assembly opening 48 formed therein and extending from an outer surface of the body 30 through to the central opening 36. The mixing element 16 may further include an actuator assembly 50 that is threadably received in the actuator assembly opening 48 to selectively axially couple the output shaft 12 and the mixing element 16. As shown in FIGS. 4 and 5, the actuator assembly 50 may include a retainer or plunger 54 having a generally cylindrical plunger shaft 56 and a generally hemispherical tip 58 defining a lip 84. The actuator assembly 50 may also include a generally cylindrical casing 60 having a central opening 61 defining a lip 82, with the central opening 61 being shaped to slidably to receive the plunger 54 therein. The actuator assembly 50 may further include a spring 65 shaped to fit over the plunger shaft 56 and to be received inside the casing 60. The actuator assembly 50 may further include a button or gripping portion 67 having a hollow stem 68 and an outer portion 70, with the stem 68 being shaped to be received inside the casing 60. The outer portion 70 may have a pair of opposed flats 72.

In order to assemble the actuator assembly 50, the spring 65 is slid over the plunger shaft 56, and the plunger 54 and spring 65 are then inserted to the central opening 61 of the casing 60. The stem 68 of the button 67 is then inserted into the opposite end of the casing 60 such that the stem 68 receives the inner end of the plunger shaft 56. A coupling pin 76 is then passed through aligned openings 78, 80 in the plunger shaft 56 and stem 68 to couple the plunger 54, casing 60 and button 67 together. The spring 65 is captured between the lip 82 of the casing 60 and the lip 84 of the tip 58 of the plunger 54. In this manner, in the absence of outside forces, the tip 58 of the plunger 54 protrudes slightly outwardly from the casing 60, as shown in FIG. 6. The casing 60 preferably includes threads 63 located on the outer surface thereof such that the actuator assembly can be threaded into the actuator opening 48 of the mixing element 16, as shown in FIGS. 5–7.

Figure 3:
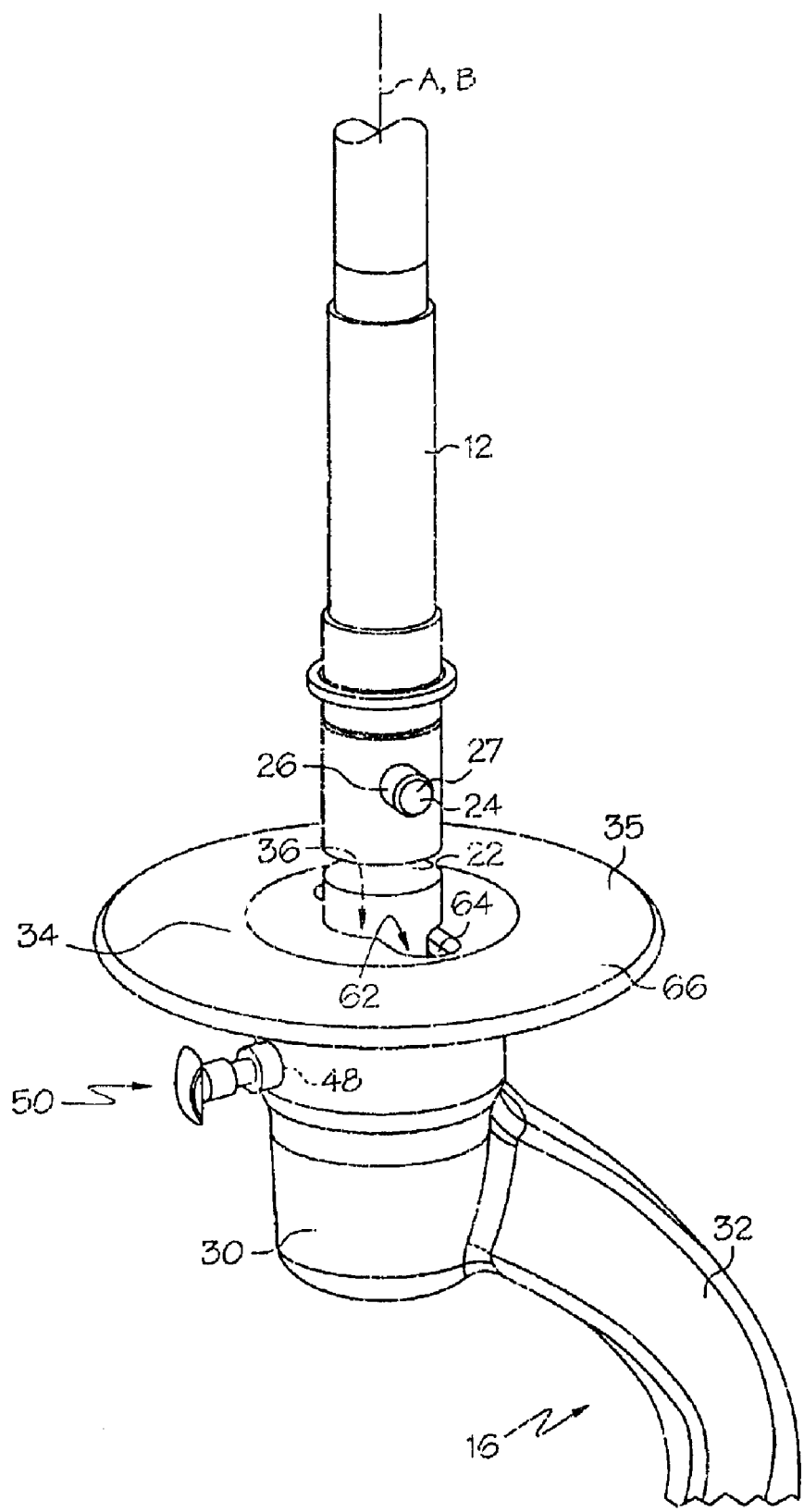
FIG. 3 is a perspective view of the output shaft and mixing element of FIG. 2, with the output shaft being partially received in the mixing element.

In order to axially couple the output shaft 12 to the mixing element 16, the mixing element 16 and output shaft 12 are axially aligned, as shown in FIG. 2. The tip 20 of the output shaft 12 is then inserted into the central opening 36 of the mixing component, as shown in FIG. 3. As shown in FIG. 5, as the output shaft 12 is inserted into the central opening 36, the tapered tip 20 of the output shaft 12 engages the curved tip 58 of the plunger 54, which urges the plunger 54 and button 76 radially outwardly (or to the left as shown in FIG. 5), thereby compressing the spring 65. Once the output shaft 12 moves the plunger 54 such that sufficient clearance is provided, the output shaft 12 can then be fully inserted into the central opening 36. As shown in FIG. 6, once the recess 22 of the output shaft 12 is aligned with the tip 58 of the plunger 54, the plunger 54 moves radially inwardly (i.e., to the right in FIG. 6), as urged by the spring 65 until the tip 58 of the plunger 54 is received in the recess 22.

In this manner, the actuator assembly 50 can axially couple the output shaft 12 to the mixing element 16. The recess 22 and/or plunger 54 are preferably located such that the plunger 54 is received in the recess 22 at the same time that the driving pin 24 of the output shaft 12 is seated in the pin recesses 62 of the mixing element 16. In this manner, when the plunger 54 is received in the recess 22, the mixing element 16 and output shaft 12 are also radially coupled together such that the mixer 10 can be operated wherein the output shaft 12 and mixing element 16 rotate to mix the contents of the bowl 20. Thus the mixing element 16 can be coupled to the output shaft 12 simply by sliding the output shaft 12 into the opening 36, and the tapered tip 20, plunger 54, driving pin 24 and pin recess 64 cooperate to ensure the mixing element 16 is axially and rotationally coupled to the output shaft 12.

When it is desired to uncouple the mixing element 16 and output shaft 12, a user can grip the button 67 of the actuator assembly 50 and pull the button 67 radially outwardly (i.e. to the left in FIG. 6). This motion of the button 67 pulls the plunger 54 out of the recess 22 (see FIG. 7), thereby compressing the spring 65. This motion moves the actuator assembly 50 from its extended or engaged position, wherein at least part of the plunger 54 extends into the opening 36, (FIG. 6) to its retracted or disengaged position, wherein the plunger 54 does not extend into the opening (FIG. 7). The mixing element can then be lowered off of the output shaft 12.

Once the mixing element 16 is lowered sufficiently such that the recess 22 is no longer aligned with the plunger 54, the button 67 may be released which causes the plunger 54 to engage the output shaft 12, as urged by the spring 65. The mixing element 16 can then be lowered off of the output shaft 12 and later recoupled to the output shaft 12, or another mixing element can be coupled to the output shaft 12 to replace the removed mixing element 16. The flats 72 of the button 67 provides a surface which can be gripped by a tool, such as a pair of pliers, in order to aid in twisting the button 67 and plunger 54 inside the casing 60 so that the plunger 54 can be loosened should the button and/or plunger 54 become stuck inside the casing 60.

In the illustrated embodiment of the mixing element 16, the retainer or axial coupling mechanism (i.e. plunger 54 and optionally groove 22) is axially spaced from the torque transmission mechanism (i.e. the driving pin 24 and pin recesses 62). Furthermore, the torque transmission mechanism enables torque to be transmitted from the output shaft 12 to the mixing element 16 in two, opposite rotational directions.

As noted above, when the plunger 54 is received in the recess 22, the plunger 54 cooperates with the recess 22 to axially couple the mixing element 16 and the output shaft 12. However, the output shaft 12 and mixing element 16 may be shaped such that the plunger 54 is located above one of the driving pins 24 when the output shaft 12 is seated in the mixing element 16 and the plunger 54 is in its engaged position. Thus, in this arrangement, the plunger 54 and driving pin 24 cooperate to axially couple the mixing element 16 and output shaft 12. When the plunger 54 is retracted, the plunger 54 may not be located over the driving pin 24 such that the output shaft 12 and mixing element 16 are no longer axially coupled. In this case the output shaft 12 may not include the recess 22.

Although the shape and dimensions of the various components may be varied to adapt the attachment mechanism 50 and mixer 10 to various needs and conditions, in one embodiment the tip 58 of the plunger 54 extends into the central opening 36 (see FIG. 6) about 0.2", and the central opening 36 has a diameter of about 1.5". The outer diameter of the output shaft 12 may be about 1.5" and the inner diameter of the output shaft 12 at the narrowest portion of the recess 22 may be about 0.99". The distance between the opposed ends of the pin recesses 62 may be about 2.95" and each of the pin recesses 62 may have a maximum depth of about 0.75" and a thickness of about 0.58". Each of the protruding portions 27 may protrude outwardly from the output shaft 12 about 0.44", and have a diameter of about 0.56".

It should be understood that a wide variety of shapes of the plunger 54 and recess 22 may be used without departing from the scope of the present invention. For example, nearly any structure beyond the plunger 54 shown herein, that can extend into the recess 22 to couple the mixing element 16 to the output shaft 12, may be used without departing from the scope of the present invention. For example, a slidable spring biased clip having an opening which receives the output shaft therethrough which can be received in the recess 22, may be used. Furthermore, the recess 22 need not extend around the perimeter of the output shaft 12, although the recess 22 preferably extends around the perimeter of the output shaft 12 to enable the plunger 54 to be received in the recess 22 at any radial position on the output shaft 12. Although in the illustrated embodiment the plunger 54 is moved linearly or radially (with respect to the axis of the output shaft 12 or mixing element 16), the plunger 54 may be rotatable or pivotable into and out of engagement with the output shaft 12. Although the tip 58 of the plunger 54 may be hemispherical and the recess 22 may also be curved in side view, the plunger 54 and recess 22 may take any of a wide variety of shapes.

Furthermore, it should be understood that any of a wide variety of mechanisms or shapes for rotationally coupling the output shaft 12 to the mixing element 16, beyond the driving pin 24 and pin recesses 62, may be used without departing from the scope of the present invention. For example, any of a wide variety of pins, levers, arms, or other devices, or other shapes of the output shaft 12 (such as an output shaft having an eccentric cross section and an opening 36 having a corresponding shape), which can transmit rotation, may be used.

Although the actuator assembly 50 is illustrated as being located on the mixing element 16 and the output shaft 12 is illustrated as being located on the mixer body 14, this orientation could be reversed such that the actuator assembly opening 48 and actuator assembly 50 are located on the output shaft 12. In this case, the output shaft 12 may serve as a female component, and may have a central opening to receive a shaft of the mixing element 16 therein. In this embodiment, the shaft of the mixing element would include the recess 22 to receive the plunger 54 of the actuator assembly 50 therein. In this embodiment the mixing element 16 would be attached to the mixer body 14 in similar manner to the embodiment described above. For example, the shaft of the mixing element 16 would be inserted into the opening of the output shaft 12 until the plunger 54 is received in the recess 22 of the shaft.

Figure 9:
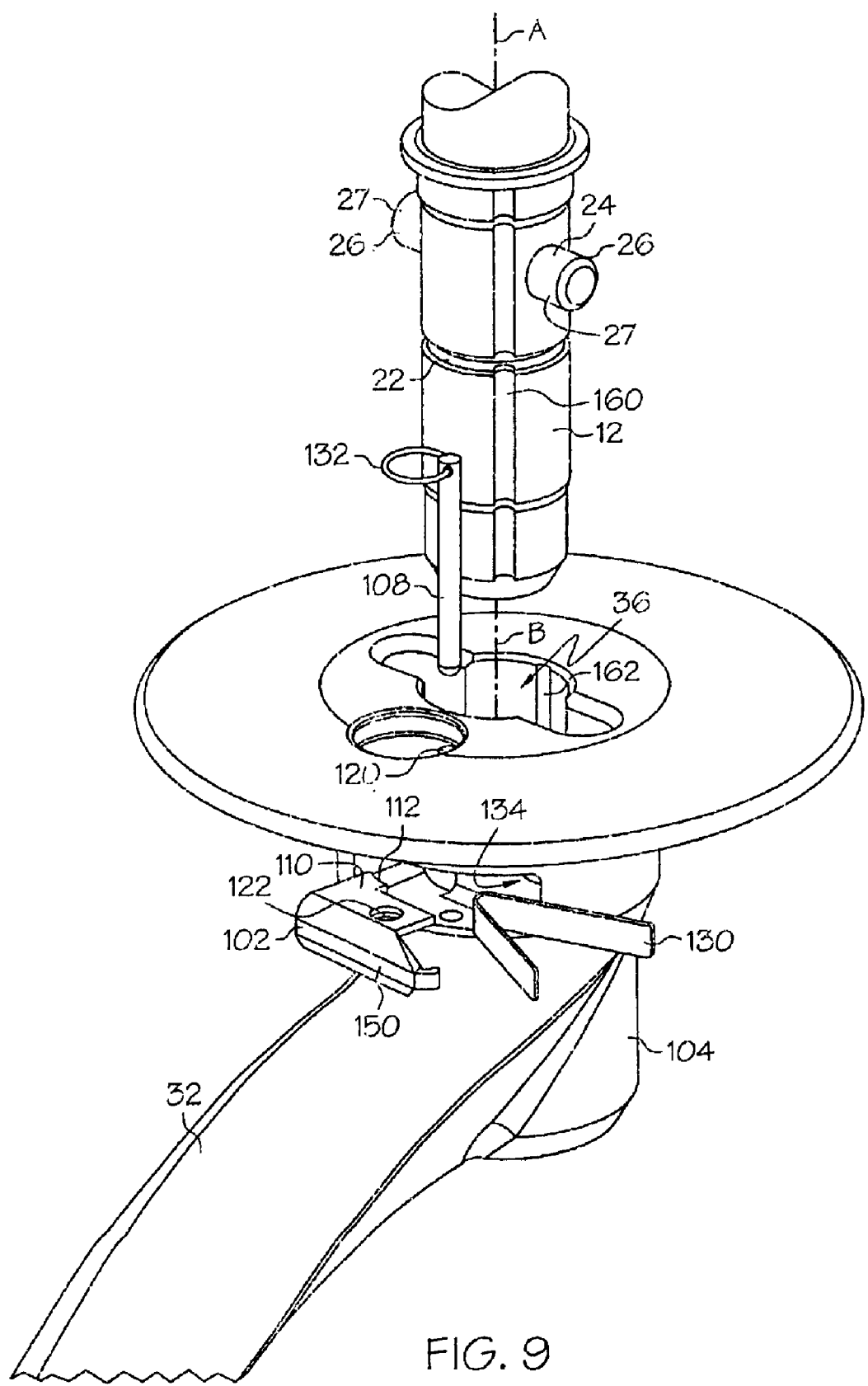
FIG. 9 is a detail, exploded perspective view of a mixing element similar to that of FIG. 8 and an output shaft of a mixer.
Figure 10:
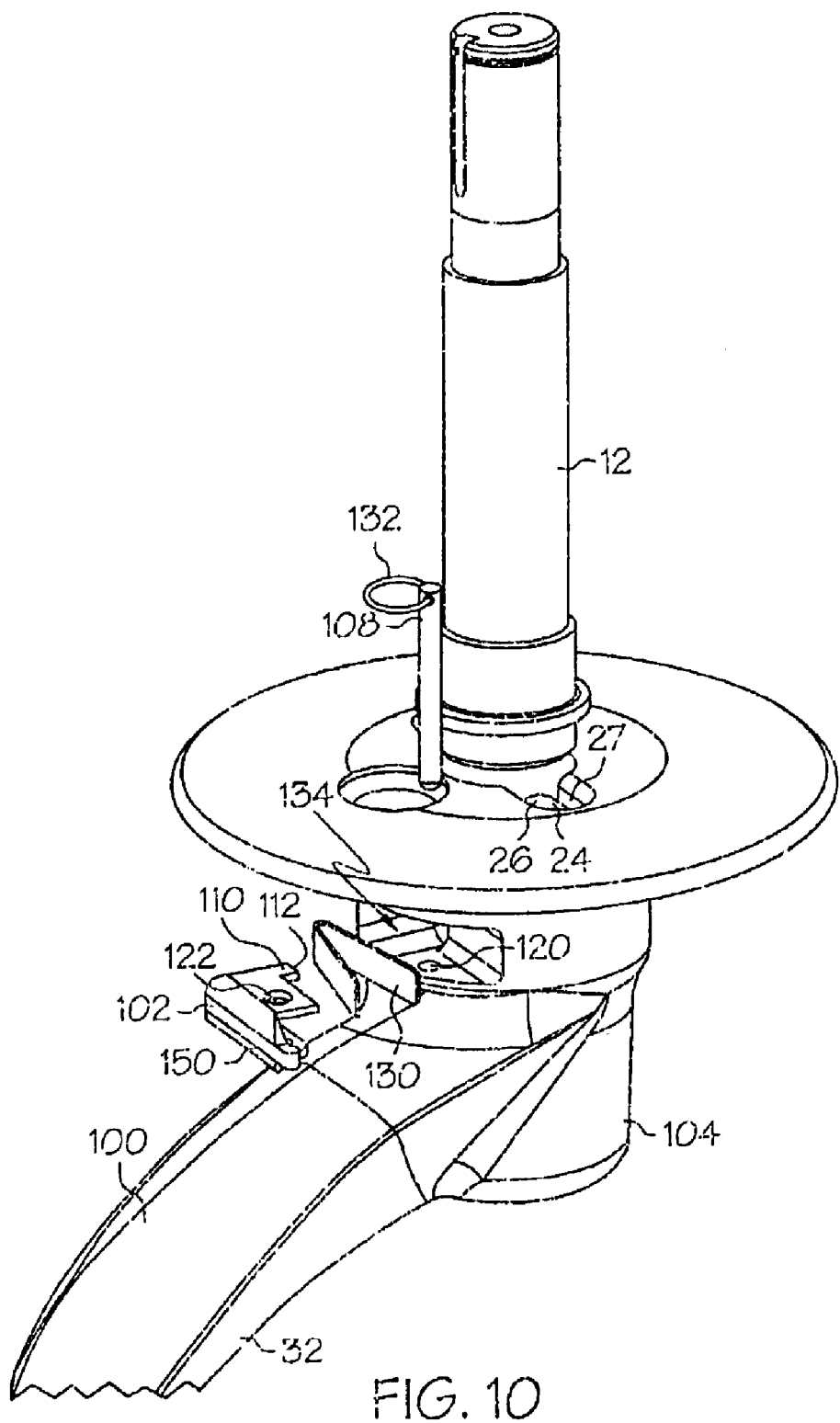
FIG. 10 is a perspective view of the mixing element and output shaft of FIG. 9, with the output shaft received in the mixing element.
Figure 11:
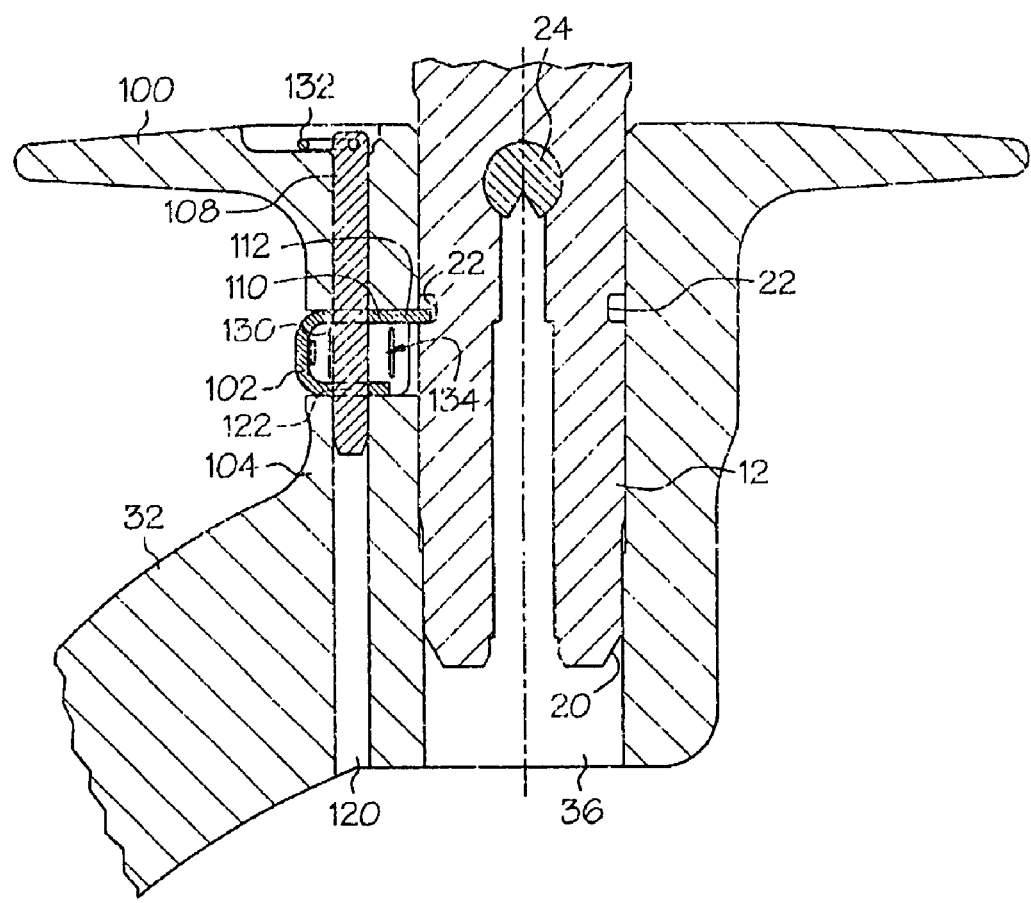
FIG. 11 is a side cross section view of the mixing element and output shaft of FIG. 10, illustrating the clip in its engaged position.
Figure 12:
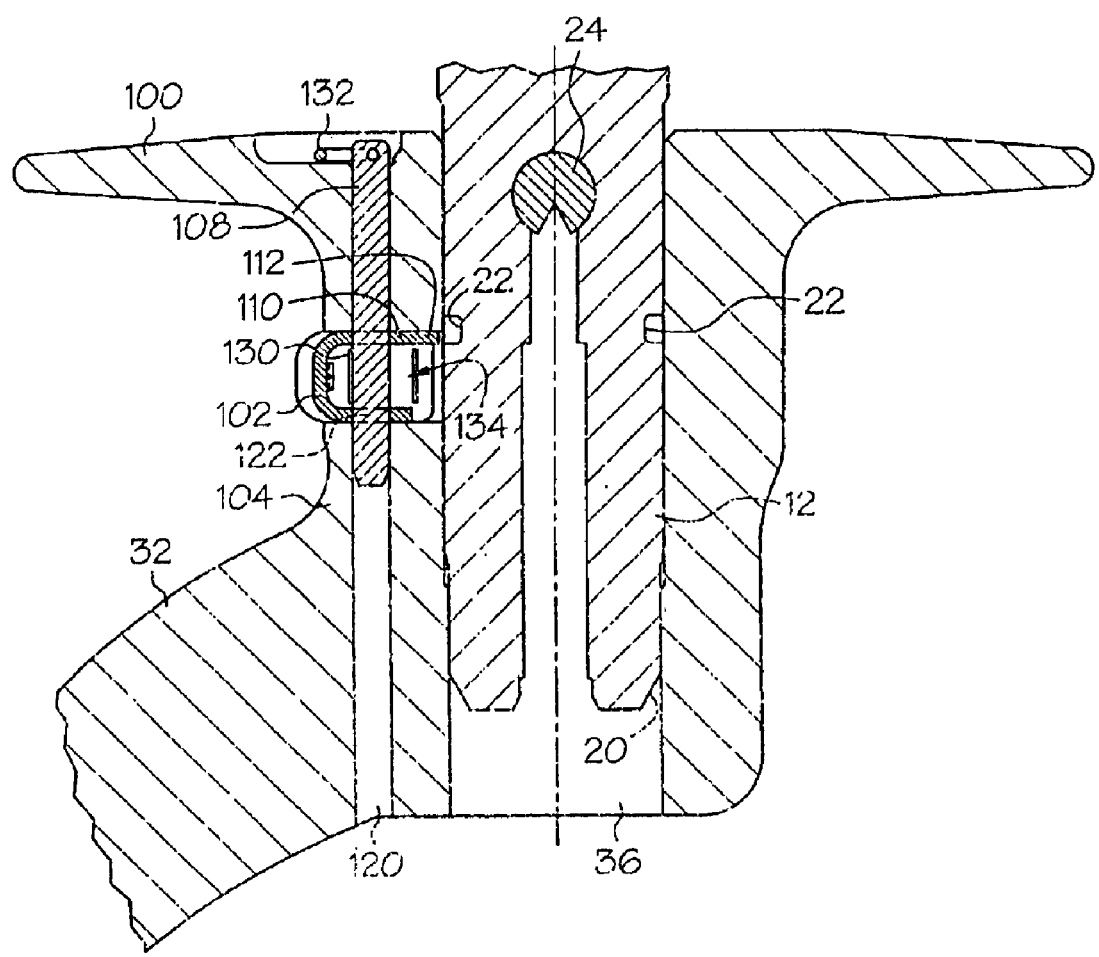
FIG. 12 is a side cross section of the mixing element and output shaft of FIG. 11, illustrating the clip in its disengaged position.
Figure 13:
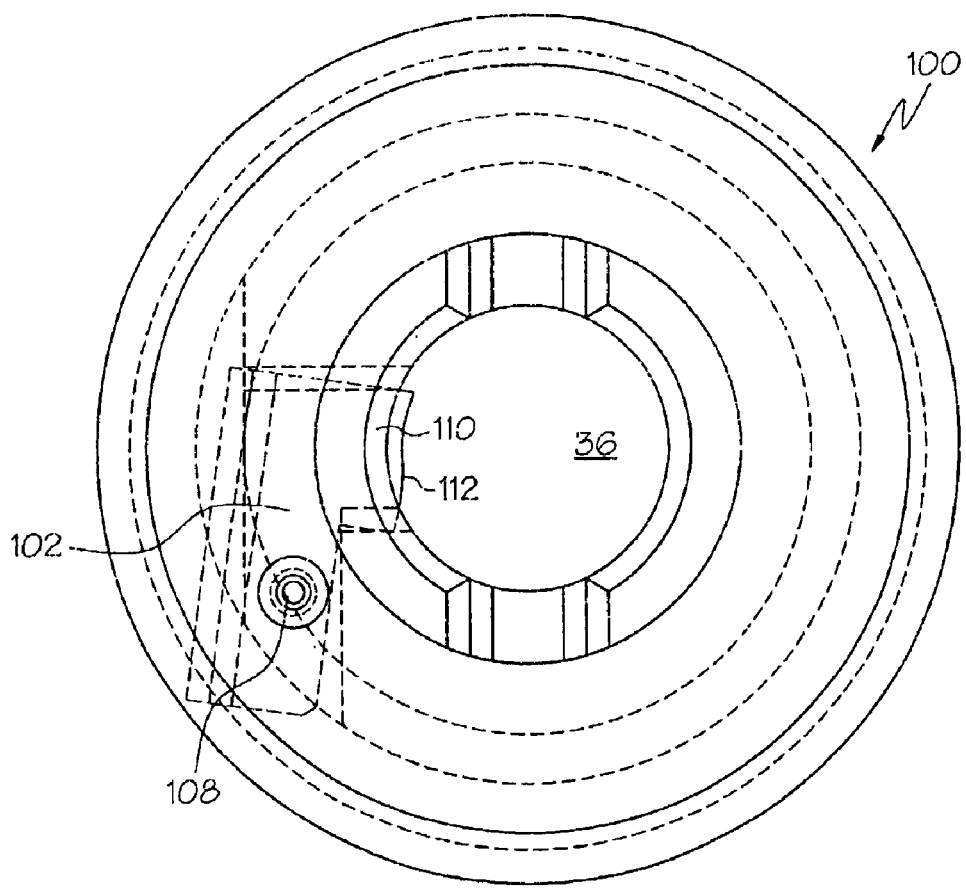
FIG. 13 is a top view of another embodiment of a mixing element.

FIGS. 8–13 illustrate another mixing element 100 which may be used with the output shaft 12. It should be understood that all reference numbers used in FIGS. 8–13, which are common to the reference numbers used above to describe the embodiment of FIGS. 1–7 are intended to refer to the same or similar components. In the embodiment of FIGS. 8–13, the mixing element 100 includes a retaining clip 102 coupled to the body 104 of the mixing element 100. The clip 102 is pivotally mounted to the mixing element 100 by a pivot pin 108 such that the clip 102 is movable (i.e. pivotable) between an engaged position wherein at least part of the clip 102 protrudes into the opening 36 and a disengaged position wherein the clip 102 does not protrude into the opening 36. For example, FIGS. 11 and 13 illustrate the clip 102 in its engaged position, and FIG. 12 illustrates the clip 102 in its disengaged position. As best shown in FIGS. 9 and 10, the clip 102 includes an engagement portion 110 having a generally curved inner surface 112. The radius of the curvature of the inner surface 112 of the engagement portion 110 may be generally matched to the radius of the recess 22 of the output shaft 12.

The mixing element 100 and clip 102 each include a pivot pin opening 120, 122. In this manner, when the pivot pin openings 120, 122 are aligned, the pivot pin 108 can be pushed through the pivot pin openings 120, 122 of the clip 102 to pivotally couple the clip 102 to the body 104 of the mixing element 100. In this manner, the clip 102 can pivot between its engaged position and a disengaged position about an axis that is generally parallel to the central axis B of the opening 36. The mixing element 16 may include a spring 130 located between the clip 102 and the body 104 to spring bias the clip 102 into its engaged position. As shown in FIGS. 9 and 10, the pivot pin 108 can be removed from the mixing element 100 by grasping the grip ring 132 of the pivot pin 108 and lifting the pivot pin 108 out of the pivot pin openings 120, 122, which thereby enables the clip 102 to be removed from the clip recess 134 of the mixing element 100 for cleaning, maintenance or replacement of the various components.

In order to couple the mixing element 100 to the output shaft 12, the output shaft 12 and mixing element 16 are aligned such that the central axis A of the output shaft 12 is generally aligned with the central axis B of the opening 36, as shown in FIG. 9. Next, the tip 20 of the output shaft 12 is inserted into the opening 36 of the mixing element 100. As the output shaft 12 is inserted into the opening 36, the tapered tip 20 of the output shaft 12 engages the engagement portion 110 of the clip 102 and pivots the clip 100 about its pivot pin 108 to its disengaged position. With the clip 102 pivoted out of the way, the output shaft 12 is then inserted deeper into the opening 36 until the recess 22 is generally aligned with the engagement portion 110 of the clip 102. When the recess 22 is aligned with the engagement portion 110 of the clip 102, the clip 102 pivots back to its engaged position (as shown in FIG. 11), as biased by the spring 130. When the clip 102 is in its engaged position, the engagement portion 110 is received in the recess 22 of the output shaft 12. In this manner, the interaction between the clip 102 and the recess 22 axially couples the output shaft 12 to the mixing element 16 (that is, the mixing element 16 is coupled to the output shaft 12 in a direction along the axes A, B.)

As shown in FIG. 10, when the mixing element 100 is axially coupled to the output shaft 12, the driving pin 24 is received in the pin recesses 64 of the mixing element 100 to rotationally couple the mixing element 16 to the output shaft 12 (that is, rotation of the output shaft 12 is transmitted to the mixing element 16). In this manner, the mixing element 16 can be coupled to the output shaft 12 simply by sliding the output shaft 12 into the opening 36, and the tapered tip 20, clip 102, driving pin 24 and pin recess 64 cooperate to ensure the mixing element 16 is axially and rotationally coupled to the output shaft 12.

In order to uncouple the mixing element 16 from the output shaft 12, the clip 102 is rotated to its disengaged position. For example, a user may press on the actuation surface 150 of the clip 102, thereby pivoting the clip 102 about the pivot pin 108 and compressing the spring 130, to pull the engagement portion 110 of the clip 102 out of the recess 22 and opening 36 (FIG. 12). With the clip 102 moved to its disengaged position, the mixing element 100 may be lowered off of the output shaft 12 for cleaning, repair, replacement and the like.

Figure 14:
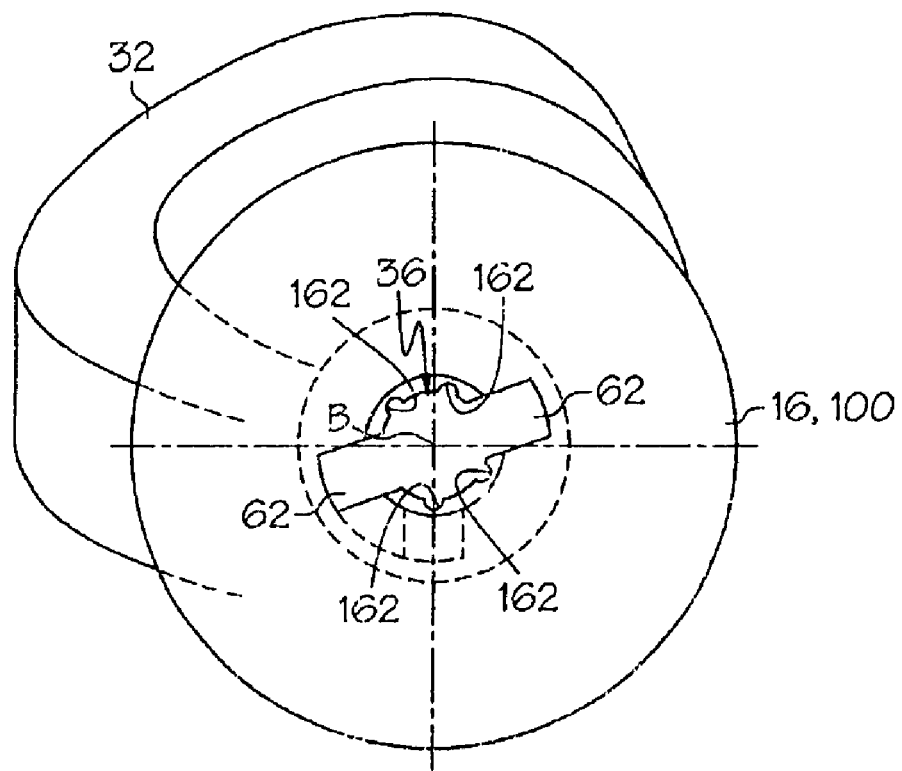
FIG. 14 is a top view of another embodiment of a mixing element.
Figure 15:
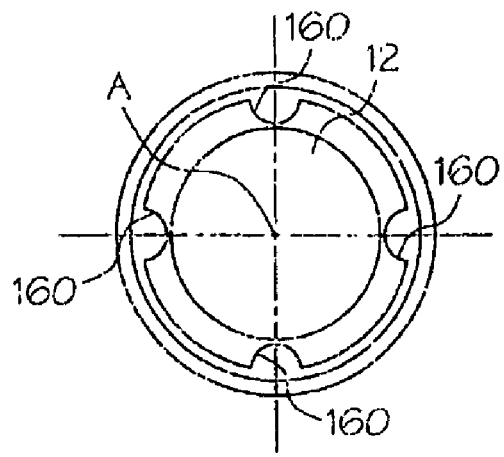
FIG. 15 is an end view of another embodiment of an output shaft.

In one embodiment, as shown in FIG. 9, the output shaft 12 may also include a plurality of generally axially-extending slots or grooves 160 formed therein (only one groove 160 being shown in FIG. 9). As shown in FIG. 15, output shaft 12 may include four equally radially-spaced grooves 160, and each groove may be generally semi-circular, or "scallop"-shaped in end view. Similarly, as shown in FIGS. 9 and 14, the opening 36 of the mixing components 16, 100 may include a plurality of generally axially-extending slots or grooves 162 formed therein, and the slots 162 are preferably generally semi-circular, or "scallop"-shaped in end view.

The axially-extending grooves or slots 160, 162 on the output shaft 12 and on the opening 36, respectively, may be used to make it easier to uncouple the mixing element 16, 100 from the output shaft 12. The slots 160, 162 make the outer surface of the output shaft 12 and the inner surface of the opening 36 discontinuous and reduce the common surface areas of the output shaft 12 and opening 36. This, in turn, reduces sticking of the output shaft 12 to the opening 36, such as due to dried food or fretting of the surfaces. If the slots are used, the slots 160, 162 may be located on the opening 36 only, on the output shaft 12 only, or on both the output shaft 12 and opening 36, although it may be preferred to form the slots 162 in the opening 36 only due to manufacturing considerations.

Having described the invention in detail and by reference to the preferred embodiments, it will be apparent that modifications and variations thereof are possible without departing from the scope of the invention.

What is claimed is:

1. A mixing element for attachment to a mixer comprising:
   a body having a mixing portion and having an opening formed therein, said opening being shaped and located to receive an output shaft of a mixer therein; and
   a retainer coupled to said body, said retainer being movable between an engaged position wherein at least part of said retainer protrudes into said opening and a disengaged position wherein said retainer does not protrude into said opening, said opening being defined by a surface of said body that is substantially continuous below said retainer, an actuator assembly shaped to be releasably coupled to said body, said actuator assembly including said retainer, wherein said actuator assembly includes a casing, a plunger received inside said casing, said plunger including said retainer, a spring located inside said casing to spring bias said plunger into said engaged position, and a button located adjacent to said casing and coupled to said plunger.

2. The mixing element of claim 1 wherein said body includes a threaded actuator assembly opening extending to said opening, and wherein said actuator assembly is threadedly received in said actuator assembly opening.

3. A mixing element for attachment to a mixer comprising:
   a body having a mixing portion and a connecting portion, the connecting portion having an upper mixer shaft receiving opening formed therein and a side opening that leads to the shaft receiving opening; and
   a plunger assembly removably coupled with said connecting portion, the plunger assembly including an outer casing removably engaged in the side opening of the connecting portion, a plunger received in the outer casing and a spring within the outer casing positioned to bias the plunger into an inward position in which an inner end of the plunger is normally positioned within the shaft receiving opening, the plunger movable to an outward position in which the inner end of the plunger is at least partially retracted from the shaft receiving opening, said plunger includes a portion protruding outward from the casing and having an enlarged gripping head for enabling manual retraction of the plunger from the inward position to the outward position.

4. The mixing element of claim 3 wherein said outer casing is threadedly engaged into said side opening.

* * * * *